Figure 1:
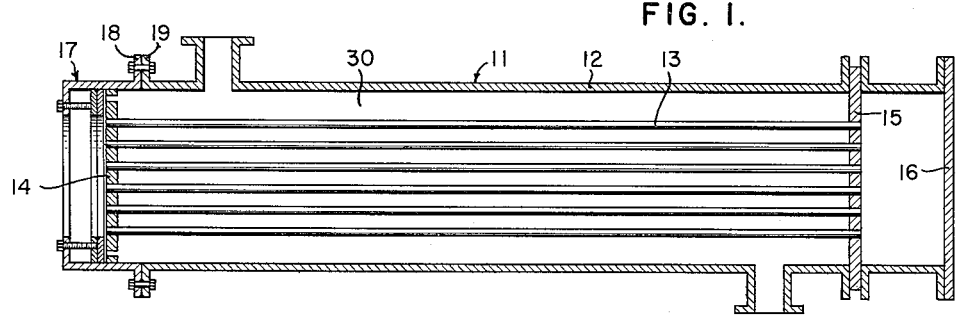

Aug. 8, 1961  H. E. SMITH  2,995,028
APPARATUS FOR TESTING HEAT EXCHANGERS
Filed July 23, 1958

INVENTOR.
HOSEA E. SMITH,
BY
ATTORNEY

United States Patent Office 2,995,028
Patented Aug. 8, 1961

2,995,028
APPARATUS FOR TESTING HEAT EXCHANGERS
Hosea Edward Smith, Highlands, Tex., assignor, by mesne assignments, to Esso Research and Engineering Company, Elizabeth, N.J., a corporation of Delaware
Filed July 23, 1958, Ser. No. 750,477
6 Claims. (Cl. 73—40)

The present invention is directed to apparatus for testing heat exchangers. More particularly, the invention is concerned with test equipment for tubular heat exchangers. In its more specific aspects, the invention is directed to apparatus for locating leaks in tubes of a heat exchanger.

The present invention may be briefly described as a combination with a tubular heat exchanger of apparatus comprising a first annular member arranged adjacent and bearing with its inner surface against the floating head of a tube bundle of a tubular heat exchanger. Sealing means are arranged between the first annular member and the floating head, and a second annular member is arranged adjacent and bearing with its inner surface against the outer surface of the first annular member. Sealing means are arranged between the first and second annular members and the shell of the heat exchanger, and separate means are provided bearing separately against the outer surface of each of said annular members urging the first annular member against the floating head and urging the second annular member against the first annular member. By this arrangement of apparatus, a seal is effected between the floating head and shell for testing the tubes of the heat exchanger.

The present invention is quite advantageous and useful inasmuch as for the first time it is now possible to test for leaking tubes in tubular heat exchangers without encountering difficulties which heretofore were encountered. Mechanical craftsmen are now able to test readily the heat exchangers without causing undue delays in operating the equipment.

Thus, it is often necessary to test heat exchanger tube bundles for tube leakage in processing operations such as refining of crude petroleum. It is necessary to determine and locate the specific tube or tubes in a leak. To accomplish this purpose, water under sufficient pressure is usually placed around the tubes in any given exchanger tube bundler, the water flowing into a leaking tube and out through the open end of the tube where any leak is observed.

Most heat exchangers contain many small straight tubes, all of which are connected at each end to circular tube sheets to form a tube bundle. This bundle is placed in the heat exchanger shell, which is usually a cylindrical metal vessel. The length and diameter of the shell, the tube bundle, and the tube sheets are so selected that one tube sheet is fastened securely to one end of the shell but the other floating tube sheet extends a few inches beyond the other end of the shell. Both tube sheets cannot be secured to the shell because of the differential expansion that occurs when the heat exchanger is in service. In order to keep water in the shell during the test, it is important to install and maintain a tight seal between the floating tube sheet and the exchanger shell. The usual test ring supplied for making a seal and effecting a test has serious weaknesses in that it is practically impossible to provide a tight seal to allow the test to be made. In accordance with the present invention, a tight seal is obtained and a test is now possible.

Figure 2:
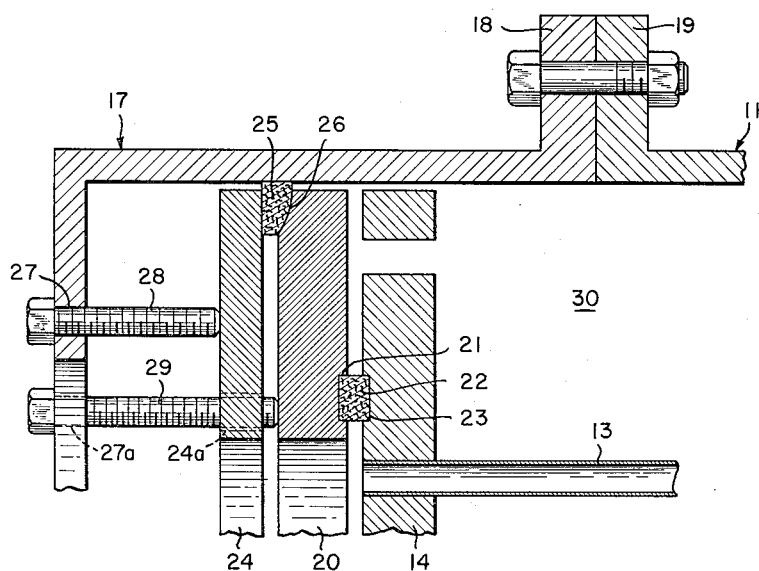
Figure 3:
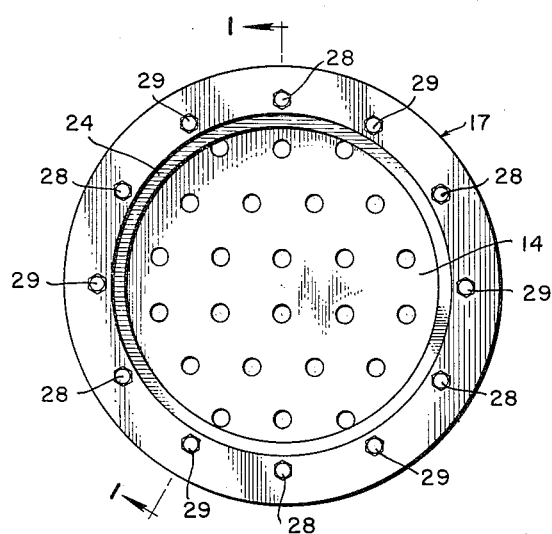

The present invention will be further described and illustrated by reference to the drawing illustrating a preferred embodiment in which:

FIG. 1 is a sectional view of a heat exchanger;
FIG. 2 is an enlarged sectional view of a portion of the heat exchanger in FIG. 1 embodying the present invention; and
FIG. 3 is an enlarged end elevational view of the heat exchanger of FIG. 1.

Referring now to the drawing in which identical numerals will be employed to designate identical parts, numeral 11 designates a heat exchanger composed of a shell 12, tubes 13, a floating head 14, and a fixed head 15. The heat exchanger 11 is closed on one end with a flanged bolted connection 16; and a test device generally indicated by numeral 17 is provided for the other end adjacent the floating head 14 to close the heat exchanger 11, the test device 17 being provided with a flange 18 to be bolted to the flange 19 of the heat exchanger 11.

Arranged within and forming part of the test device 17 is a first ring or annular member 20 having a recess 21 on its interior edge in which is peripherally arranged a sealing member or gasket 22 which may fit snugly in a corresponding recess 23 in the floating head 14. The sealing member 22 may be arranged in a recess on the ring 20 or in a recess on the floating head 14 or in a recess on either one or both of the elements 20 or 14. A second ring member 24 is arranged adjacent the ring 20 and this ring 24 has arranged between it and the ring 20 a second sealing means or gasket 25, which may be arranged in a recess either in the ring 24 or in a recess 26 in the ring 20.

Like the gasket 22, the gasket 25 may be arranged in a recess in the ring 24 or in a recess 26 in the ring 20 as may be desired. In short, the gaskets 22 and 25 may be arranged in a recess in one or both of the members between which it is sealing.

Extending through threaded openings 27 and 27a, respectively, in the test device 17 on the exterior of the heat exchanger 11 are threaded bolts 28 and 29 which bear separately against the ring 24 and the ring 20, respectively, urging the ring 24 against the ring 20 and urging the ring 20 against the floating head 14, thereby effecting a seal between the ring 20 and the floating head 14 and effecting a seal between the ring 24 and 20 and between the shell 12 of the heat exchanger 11. Openings 24a in plate 24 are provided for bolts 29. The annular member 20 and the annular member 24 are both free of attachments from the structure and are maintained in place as shown in the drawing by the bolts 28 and 29 which bear frictionally thereagainst, respectively, as shown in FIG. 2 of the drawing. Thus water within the space 30 of the heat exchanger will be forced into any leak which may occur in any of the tubes 13 of the heat exchanger 11.

The present invention has been used successfully in testing heat exchangers employed on a catalytic reforming unit in which hydrocarbons were catalytically converted employing a platinum catalyst. In this operation in testing a heat exchanger such as 11 for leaks in the tube 13, a ring such as 20 with a gasket 22 was placed as shown in FIGS. 1 and 2 and then a second ring such as 24 with a gasket such as 26 was arranged as shown in FIGS. 1 and 2, both gaskets and rings being first put loosely in place. The threaded bolt 29 was then tightened urging the ring 20 against the floating head 14. Then ring 24 was tightened by the threaded bolt 28 being turned to force the ring 24 and the gasket or sealing means 25 against the ring 20 and against the shell 12. This operation resulted in a tight seal and the tubes 13 were tested satisfactorily with water pressure.

Besides providing a tight seal, the present invention, with the separate means such as bolts 28 and 29, allows the gaskets 25 and 22 to be tightened in the event a leak should occur.

This operation has been used successfully on a commercial reforming unit in testing the heat exchangers thereon. The operation and test were performed by the workmen who usually recondition and test heat exchangers without them incurring any difficulty and without any leaks around the shell being observed.

The nature and objects of the present invention having been completely described and illustrated, what I wish to claim as new and useful and secure by Letters Patent is:

1. In combination with a tubular heat exchanger having a floating head for tubes and having a shell enclosing the tubes, apparatus which comprises a first annular plate member arranged adjacent and bearing with its inner flat surface against said floating head and free of attachment from said heat exchanger, means sealing between said first annular member and said floating head, a second annular plate member arranged adjacent and bearing with its inner flat surface against the outer flat surface of said first annular member and free of attachment from said heat exchanger, means sealing between said first and second annular members and the shell of said heat exchanger, and separate means bearing separately against the outer flat surface of each of said annular members urging said first annular member against the floating head and urging the second annular member against the first annular member, whereby a seal is effected between said floating head and shell for testing said tubes.

2. In combination with a tubular heat exchanger having a floating head for tubes and having a shell enclosing the tubes, apparatus which comprises a first annular plate member arranged adjacent and bearing with its inner flat surface against said floating head and free of attachment from said heat exchanger, first annular sealing means arranged between said first annular member and said floating head, a second annular plate member arranged adjacent and bearing with its inner flat surface against the outer flat surface of said first annular member and free of attachment from said heat exchanger, a second annular sealing means arranged between said first and second annular members and the shell of said heat exchanger, and separate threaded means connected externally to said heat exchanger bearing separately against the outer flat surface of each of said annular members urging said first annular member against the floating head and urging the second annular member against the first annular member, whereby a seal is effected between said floating head and shell for testing said tubes.

3. Apparatus in accordance with claim 2 in which the first annular sealing means is peripherally arranged on said first annular member adjacent its inner edge.

4. Apparatus in accordance with claim 2 in which the second annular sealing means is peripherally arranged on said first annular member adjacent its outer edge.

5. In combination with a tubular heat exchanger having a floating head for tubes and having a shell enclosing the tubes, apparatus which comprises a first annular plate member arranged adjacent and bearing with its inner flat surface against said floating head and free of attachment from said heat exchanger, first annular sealing means peripherally arranged on the inner edge of said first annular member between said first annular member and said floating head, a second annular plate member arranged adjacent and bearing with its inner flat surface against the outer flat surface of said first annular member and free of attachment from said heat exchanger, second annular sealing means peripherally arranged on the outer edge of said first annular member between said first and second annular members and the shell of said heat exchanger, and separate threaded means connected exteriorly to said heat exchanger bearing separately against the outer flat surface of each of said annular members urging said first annular member against the floating head and urging the second annular member against the first annular member, whereby a seal is effected between said floating head and shell for testing said tubes.

6. In combination with a tubular heat exchanger having a floating head member for tubes and having a shell enclosing the tubes, apparatus which comprises a first annular plate member arranged adjacent and bearing with its inner flat surface against said floating head member and free of attachment from said heat exchanger, first means sealing between said first annular member and said floating head member, said first sealing means being arranged in a recess in one of said members between which it is arranged, a second annular plate member arranged adjacent and bearing with its inner flat surface against the outer flat surface of said first annular member and free of attachment from said heat exchanger, second means sealing between said first and second annular members and the shell of said heat exchanger, said second sealing means being arranged in a recess in one of said annular members, and separate means bearing separately against the outer flat surface of each of said annular members urging said first annular member against the floating head and urging the second annular member against the first annular member, whereby a seal is effected between said floating head and shell for testing said tubes.

References Cited in the file of this patent
UNITED STATES PATENTS

| | | |
|---|---|---|
| 1,596,394 | Braun | Aug. 17, 1926 |
| 2,517,921 | Phrares | Aug. 8, 1950 |